March 21, 1967    E. HILDEBRANDT ETAL    3,310,088
BLOW MOLDED TWO-PIECE CARTON
Filed Nov. 19, 1964
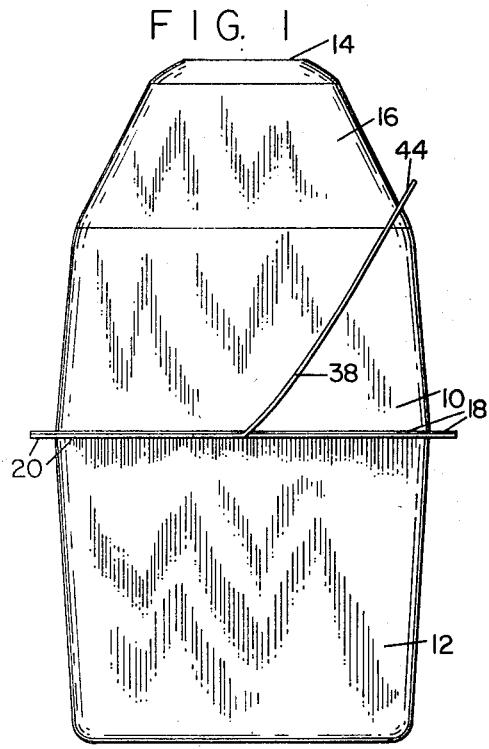
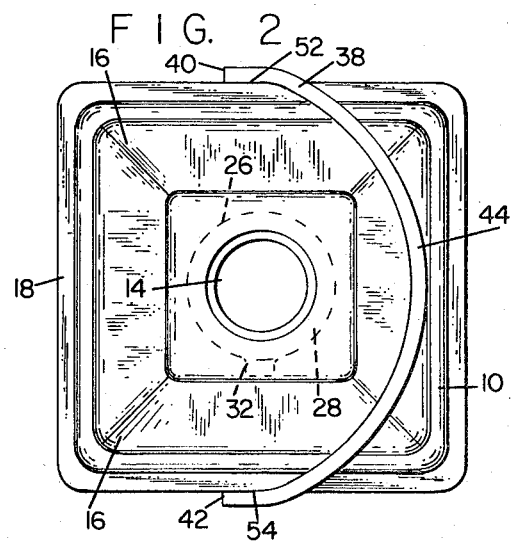
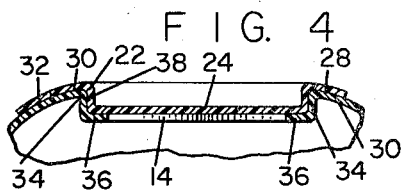
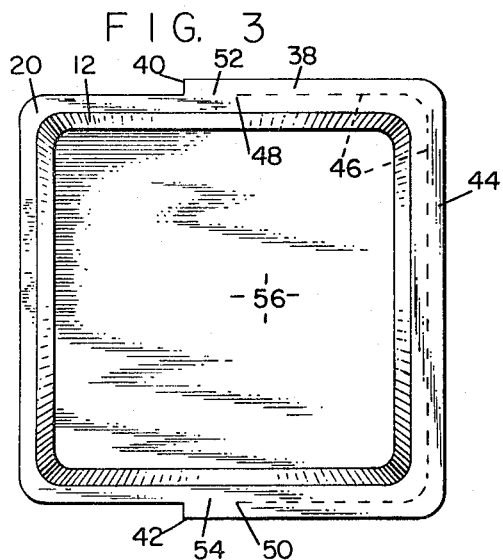
INVENTORS
EDMUND HILDEBRANDT
SIEGFRIED FAHRNICH
BY *Charles R. Fay*
ATTORNEY United States Patent Office 3,310,088
Patented Mar. 21, 1967

3,310,088
BLOW MOLDED TWO-PIECE CARTON
Edmund Hildebrandt and Siegfried Fahnrich, both of 6 Cedar St., Clinton, Mass. 01510
Filed Nov. 19, 1964, Ser. No. 412,385
6 Claims. (Cl. 150—.5)

This invention relates to a new and improved plastic container particularly adapted for liquids, granular or powdered materials or the like, and the principal object of the invention resides in the provision of a vacuum formed two-part container of very thin material, rendering it very inexpensive so that it can be disposed of after one use, and which is easy to ship and assemble but once assembled is leakproof. An instance of use to which the present invention may be put is for milk containers, particularly of half gallon and gallon sizes, and the invention provides for a non-breakable completely leakproof milk container, although the invention may be utilized to hold other materials.

The inexpensive plastic carton of the class described is made in two separate parts which can be nested and as a matter of fact nested in stacks to be shipped in knockdown or unassembled condition very inexpensively. The nesting parts are quickly and easily removed from the stack, and rearranged for assembly, the container having corresponding outstanding heat-sealable rims which are easily secured at the filling area for completing the carton.

A further object of the invention resides in the provision of a new and improved handle construction which is extremely inexpensive. This handle construction is originally formed as part of the rim of one portion of the container, and is then substantially severed therefrom except at the extreme ends thereof providing a U-shaped bail or the like which is easily flexed for carrying the container thereby without appreciably adding to the cost of the container.

Another object of the invention resides in the provision of a new and improved closure, the closure being heat sealed to the plastic surrounding the pouring opening thereof and being quickly and easily removed therefrom.

Other objects and advantages of the invention will appear hereinafter.

Reference is to be had to the accompanying drawings in which:

FIG. 1 is a view in elevation showing the complete container including the handle;

FIG. 2 is a top plan view thereof looking in the direction of arrow 2 in FIG. 1;

FIG. 3 is a top plan view of the bottom portion of the container, and

FIG. 4 is a cross sectional view through the closure.

In carrying out the present invention, the new container comprises two plastic containers substantial half portions which are indicated generally at 10 and 12. These are conveniently vacuum formed very inexpensively.

The top portion 10 is preferably formed in a kind of truncated pyramid shape for easy pouring through the opening thereof which is indicated at 14 being arranged in a narrowed portion 16 of the top portion 10. The top portion 10 is molded with an integral outstanding continuous rim 18 thereon which is adapted for being heat-sealed with respect to the outstanding smaller rim 20 of the lower portion 12. The lower portion 12 is preferably of tapering form as clearly shown in FIG. 1; the top portion is nestable in the bottom portion 12, and the parts can be shipped this way in stacks. Either a series of bottom portions 12 may be stacked with a series of top portions 10 being stacked separately, or they may be stacked bottom portions alternately with the top portions, depending on which way is easier for rearrangement of two parts at the plant where the filling is done through the opening 14.

It will be appreciated that all that is necessary to do to complete the container is to arrange the outstanding and coextensive flanges or rims 18 and 20 together as shown in FIG. 1. When so arranged they are quickly and easily heat-sealed together, completing the container except for the closure.

The closure itself is a plastic member which is indicated generally by the reference numeral 22. It has a depressed central portion 24 but is otherwise circular as is indicated in dotted lines at 26 in FIG. 2. It has an outstanding rim 28 which is continuous about the same and this rim is adapted to be heat-sealed in the areas indicated at 30 in FIG. 4. There is also a lip or tab 32 which is merely a part of the rim but outstanding therefrom and this portion of the device need not be heat-sealed so that it can be easily lifted and the entire closure at 24 stripped from the area surrounding the opening of the container.

As shown in FIG. 4 the opening at 14 is defined by an annular downturned slightly undercut rim portion 34 and an inwardly extending continuous flange 36. The bottom portion of the closure 24 rests on the inwardly directed rim portion 36, see FIG. 2 and a portion of the closure which is indicated at 38 corresponds to the downturned undercut portion 34 and snaps into it slightly so as to aid in holding the closure in place when it is reapplied to the opening 14 to reclose the cotnainer.

The handle construction is best shown in FIGS. 1 and 3. This handle is originally molded as an outstanding portion of the rim 20 of the lower portion 12 of the container. This is shown by the reference numeral 38. This indicates a U-shaped member which extends about the major portion of the circumference of the flange 20 in FIG. 3 from a point at 40 terminating at a point 42 and extending at 44 completely about one side of the bottom portion 12 and over the major portions of the two adjacent sides thereof. When this container has been thus molded, it is then cut along the dotted line 46 from a point at 48 to a point at 50, thus leaving the areas at 52 and 54 connected. The portion at 44 then forms a bail, see FIG. 2, which of course is flexible and even stretchable, and can be brought up substantially to the position shown in FIG. 1 where it is grasped by the fingers of the person carrying the container which will be carried at a slight tilt. It will be seen that if the top part of the container 10 were made of a relatively short height, the bail at 44 could even extend over the top, but as shown it does not quite reach the top and therefore the container will be carried at a slight tilt. On the other hand, the bottom 56 of the bottom portion 12 may be made completely flat so that the container is set in upright condition with the pouring opening 14 at the top thereof, and this is particularly useful in storing the container in a refrigerator, or on shelves, etc. As stated above, the parts are very easily and inexpensively manufactured, shipped and assembled. The container is easily filled and is easily capped by heat-sealing the closure 24 about the periphery at 28 of the opening 14. This closure is however easily stripped to open the container once more if this should be found to be desirable.

It will be noted that with the handle member 44 integral with the flange or rim 20 of the bottom member 12, the flange or rim 18 of the top member 10 acts as a reenforcement therefor and tends to resist disrupted forces.

An addition advantage with respect to the cap resides in the fact that a portion of the rim thereof as for instance at 28 can be secured to the underlying portion of the container as at 30, see FIG. 4, in such a way as to prevent it from being stripped off, so that the cap can be removed only in part from the container and has a hinge portion which connects it to the container for closing the same once more after it has been first opened, without the danger of losing the cap.

Having thus described our invention and the advantages thereof, we do not wish to be limited to the details herein disclosed, otherwise than as set forth in the claims, but what we claim is:

1. A leakproof container comprising two half portions of relatively thin molded plastic material, said half portions being nestable and each half portion comprising a relatively deep box-like continuous container member having a closed bottom and an open top, one container member however being provided with a pouring opening, a peripheral flange integrally molded with each half portion surrounding the open top thereof, said flanges being substatnially co-extensive in area, size and shape and being capable of being secured together by heat-sealing, with one container portion inverted with relation to the other container portion thereof, and a handle for the container, the handle being in the general form of a U and being integral at its ends to one of the container half portions at opposite sides thereof, said handle ends being integral with the flange of one of said container half portions.

2. The container of claim 1 wherein the handle is on the bottom container portion and is flexible so that it can be bent upwardly into the general area of the top portion of the container to act as a handle in the manner of a bail.

3. The method of making a container comprising molding two somewhat similar parts each of which has a substantially closed and an open end and forming outstanding rims about the open ends thereof, severing a portion of one of the rims therefrom, leaving end portions of the severed portion integral therewith forming a bail, heat-sealing the rims of the two container portions together, and bending up the severed portion of the rim of one of said container parts into the general area of the other container part so that the container can be carried by the bail-like handle.

4. A leakproof container comprising two half portions of relatively thin molded plastic material, said half portions being nestable and each half portion comprising a relatively deep box-like continuous container member having a closed bottom and an open top, one container member however being provided with a pouring opening, a peripheral flange integrally molded with each half portion surrounding the open top thereof, said flanges being substantially coextensive in area, size and shape and being capable of being secured together by heat-sealing, with one container portion inverted with relation to the other container portion thereof, and a handle for the container, the handle being in the general form of a U and being integral at its ends to one of the container half portions at opposite sides thereof, a depressed annular flange extending about the pouring opening within the confines thereof, and a closure, said closure having a central depressed portion which fits the depressed portion surrounding the pouring opening and having an outwardly extending annular portion overlying the edges of the container about the pouring opening thereof and being heat-sealed thereto.

5. The container recited in claim 4 including an extending tab on said heat-sealed rim for removing the same.

6. The container recited in claim 1 including a hinge portion for said closure, said hinge portion being connected to the material of the container member which has the pouring opening therein, so that the closure is not fully removable but is permanently secured thereto.

References Cited by the Examiner
UNITED STATES PATENTS

| | | | |
|---|---|---|---|
| 2,982,434 | 5/1961 | Hidding | 215—100 |
| 3,000,527 | 9/1961 | Jennings et al. | 215—100 |
| 3,142,422 | 7/1964 | Mojournier | 220—4 X |

FRANKLIN T. GARRETT, *Primary Examiner.*